(12) United States Patent
Kozin et al.

(10) Patent No.: US 9,396,218 B2
(45) Date of Patent: Jul. 19, 2016

(54) DATABASE INSERT WITH DEFERRED MATERIALIZATION

(71) Applicant: International Business Machines Corporation, Armonk, NY (US)

(72) Inventors: Daniel Kozin, Santa Clara, CA (US); Meichi M. Lin, San Jose, CA (US); Arthur Marais, Montgomery, TX (US); Nigel G. Slinger, Los Gatos, CA (US); John B. Tobler, San Jose, CA (US); Wen J. Zhu, Beijing (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 14/027,346

(22) Filed: Sep. 16, 2013

(65) Prior Publication Data

US 2015/0081616 A1  Mar. 19, 2015

(51) Int. Cl.
G06F 17/30 (2006.01)
G06F 7/00 (2006.01)

(52) U.S. Cl.
CPC .... *G06F 17/30292* (2013.01); *G06F 17/30383* (2013.01)

(58) Field of Classification Search
USPC .......................................................... 707/602
See application file for complete search history.

(56) References Cited

U.S. PATENT DOCUMENTS

| | | | |
|---|---|---|---|
| 6,353,820 B1 | 3/2002 | Edwards et al. | |
| 6,363,387 B1 * | 3/2002 | Ponnekanti | ....... G06F 17/30348 |
| 6,594,653 B2 | 7/2003 | Colby et al. | |
| 7,171,423 B2 | 1/2007 | Nishikawa et al. | |
| 7,509,359 B1 | 3/2009 | Bruso et al. | |
| 2004/0122828 A1 * | 6/2004 | Sidle | .................. G06F 17/30383 |
| 2005/0235001 A1 * | 10/2005 | Peleg | ................. G06F 17/30383 |
| 2010/0185847 A1 | 7/2010 | Shasha et al. | |
| 2015/0081745 A1 | 3/2015 | Kozin et al. | |

FOREIGN PATENT DOCUMENTS

EP     1770527 A2     4/2007

OTHER PUBLICATIONS

Armendariz-Inigo et al.: "MADIS-SI: A Database Replication Protocol with Easy Recovery", Instituto Tecnologico de Informatic, Universidad Politecnica de Valencia, Valencia, Spain, Jul. 12, 2006.*
DBArtisan User Guide: Copyright © 1994-2008 Embarcadero Technologies, Inc., 100 California Street, 12th Floor San Francisco, CA 94111 U.S.A.*
Yanif Ahmad et al, "DBToaster: A SQL compiler for high-performance delta processing in main-memory databases", Journal Proceedings of the VLDB Endowment, vol. 2(2), pp. 1566-1569, 2009.

* cited by examiner

*Primary Examiner* — Kuen Lu
(74) *Attorney, Agent, or Firm* — Mohammed Kashef; Edell, Shapiro & Finnan, LLC

(57) ABSTRACT

According to one embodiment of the present invention, a system inserts data into a database object. The system associates the database object with a parameter specifying materialization of data for the database object. The system inserts data into the database object and materializes the data in accordance with the parameter to provide access to the data from the database object, wherein the parameter specifies a portion of the data to be materialized upon insertion. Embodiments of the present invention further include a method and computer program product for inserting data into a database object in substantially the same manners described above.

13 Claims, 4 Drawing Sheets

DATABASE INSERT WITH DEFERRED MATERIALIZATION

BACKGROUND

1. Technical Field

Present invention embodiments relate to database insert operations, and, more specifically, to insert operations with deferred or partial materialization.

2. Discussion of the Related Art

Database management systems (DBMSs) for online transaction processing (OLTP) manage high insert transaction rates generated by increasing numbers of data producing devices. A common measure of insert performance is external throughput rate (ETR), defined as the number of completed transactions divided by elapsed time.

To insert data into a table, a DBMS physically writes the data to storage designated for the table data (e.g., to pages in a table space), updates indexes for the table, and writes a record of the insert operation to the database log to ensure that the transaction is recoverable. Physically writing to the table requires locking pages or rows in the table and searching to determine where free space exists in the table storage area. The time consumed by these activities affects insert performance.

Multithreading can be used to increase insert throughput. However, since multithreading leads to concurrent insert processing with conflicts, ETR does not scale linearly with the number of concurrent threads.

BRIEF SUMMARY

According to one embodiment of the present invention, a system inserts data into a database object. The system associates the database object with a parameter specifying materialization of data for the database object. The system inserts data into the database object and materializes the data in accordance with the parameter to provide access to the data from the database object, wherein the parameter specifies a portion of the data to be materialized upon insertion. Embodiments of the present invention further include a method and computer program product for inserting data into a database object in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments insert data into a database object without immediately materializing all of the inserted data. For example, a database table may be designated for deferred materialization. When a row is inserted into the table, the row data and table identifier are recorded in the database log, but the row data is not immediately written to the table storage space. An asynchronous process may then read the data from the log and write the data to the table storage space.

One aspect of a present invention embodiment is to improve insert performance where the inserted data need not be promptly available for reading. An example is an audit table for access to customer data in a database. An auditor may need to access the audit data, but typically the auditor does not analyze the data immediately after a record is inserted in the table. Another example is text message history. Service providers generally preserve users' past text messages, but, after transmission, old text message content is rarely, if ever, accessed. Database workloads handling inserts of audit, history, or similar data need not write the data into the table or update indexes because the data need not be accessed immediately.

Figure 1:
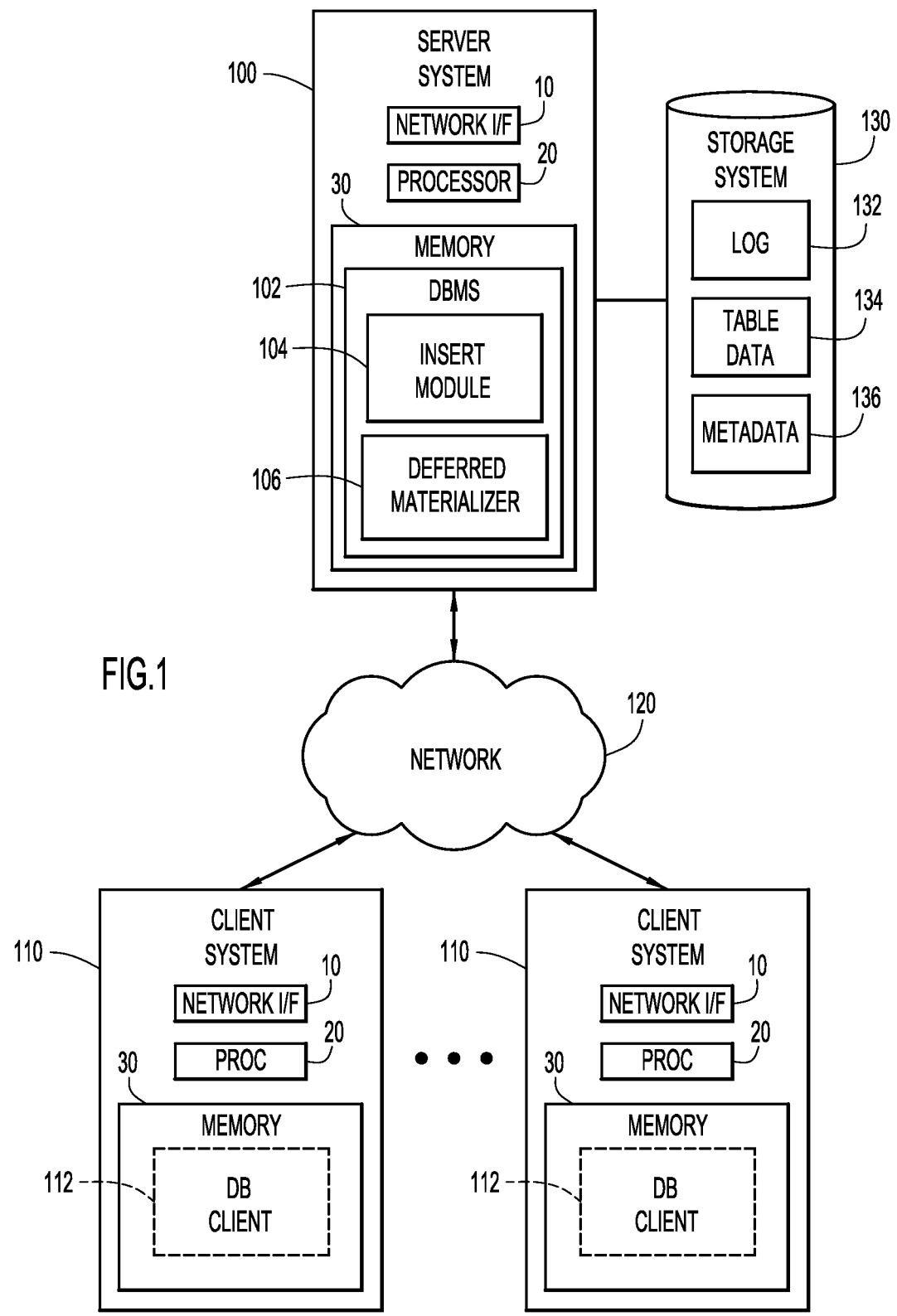
FIG. 1 is a diagrammatic illustration of an example computing environment for an embodiment of the present invention.

An example computing environment for a present invention embodiment is illustrated in FIG. 1. Specifically, the environment includes server systems 100, and one or more client or end-user systems 110. Server systems 100 and client systems 110 may be remote from each other and communicate over a network 120.

Network 120 may be implemented by any number of any suitable communications media (e.g., wide area network (WAN), local area network (LAN), Internet, intranet, etc.). Alternatively, any number of server systems 100 and client systems 110 may be local to each other, and communicate via any appropriate local communication medium (e.g., local area network (LAN), hardwire, wireless link, intranet, etc.).

A server system 100 may include a database management system (DBMS) 102 for storing and accessing data in storage system 130. The DBMS includes insert module 104 and deferred materializer 106. Insert module 104 processes insert instructions (e.g., SQL INSERT statements or other data manipulation language statements to insert data into a data object) submitted to the DBMS (e.g., by client system 110 via network 120). Storage system 130 includes log 132, table data 134, and metadata 136. The DBMS and storage system may be implemented across plural server systems. Alternatively, the storage system, DBMS, insert module, and/or deferred materializer may reside on a client system 110 or other computer system in communication with the client system and/or server system.

Client systems 110 may include a database client 112 to enable users to communicate with the DBMS (e.g., via network 120). The client systems may present any graphical user (e.g., GUI, etc.) or other interface (e.g., command line prompts, menu screens, etc.) for the database client and/or other applications to receive commands from users and interact with the DBMS and/or other modules or services.

Server systems 100 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., DBMS software, insert module software, deferred materializer software, etc.). Storage system 130 may be implemented by any number of conventional or other, local or remote storage devices (e.g., magnetic disk drives, tape drives, solid state devices, etc.).

The DBMS, insert module, and deferred materializer may include one or more modules or units to perform the various functions of present invention embodiments described below (e.g., processing commits, processing reads, logging transactions, indexing, managing metadata, materializing table data, etc.), may be implemented by any combination of any quantity of software and/or hardware modules or units, and may reside within memory 30 of a server system and/or client systems for execution by processor 20.

Figure 2:
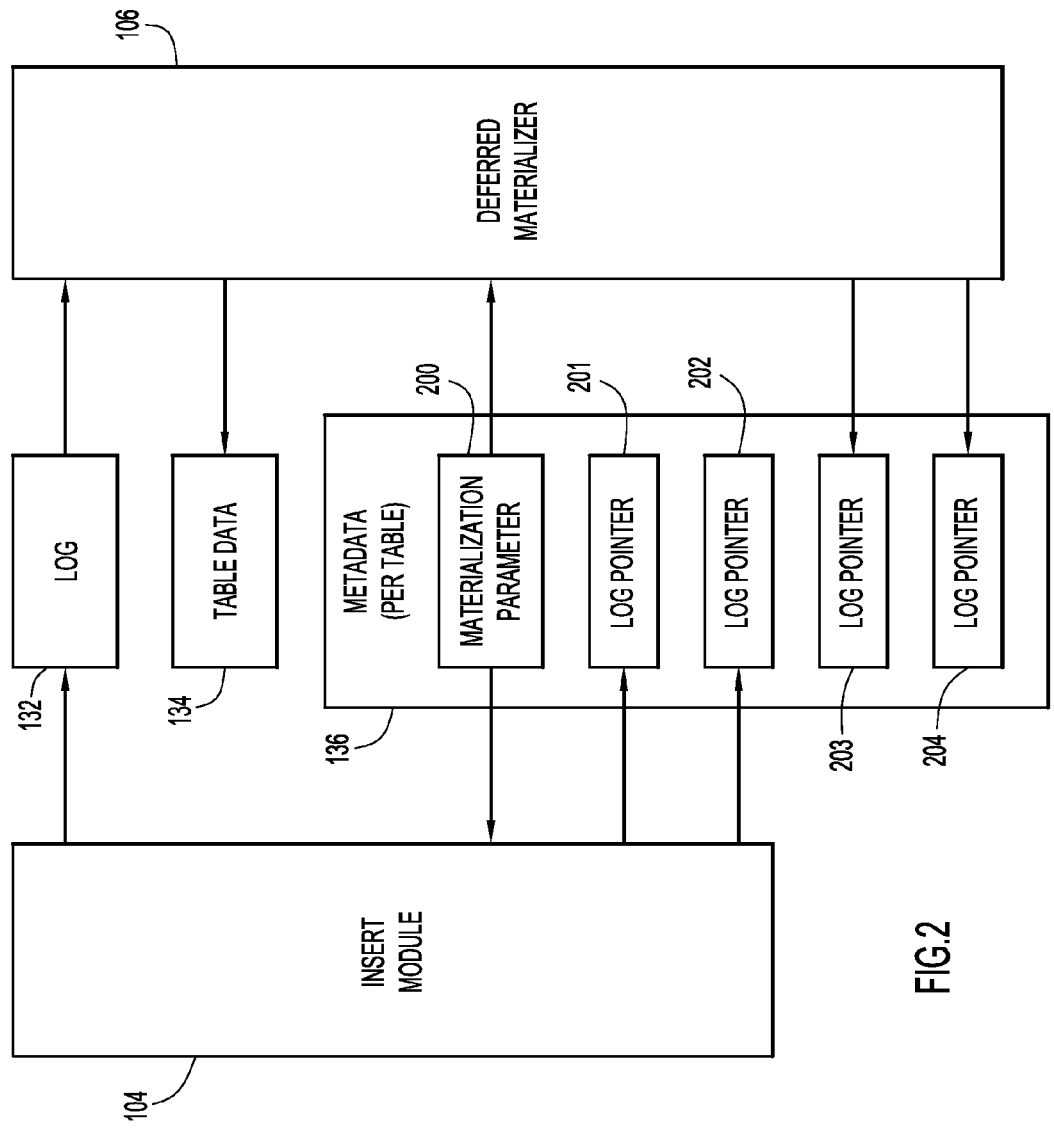
FIG. 2 is block diagram depicting example information stored and accessed by an insert module and deferred materializer according to an embodiment of the present invention.

A block diagram of example information stored and accessed by insert module 104 and deferred materializer 106 according to an embodiment of the present invention is illustrated in FIG. 2. For each table (or group of tables), metadata 136 may include, e.g., a materialization parameter 200 and log pointers 201, 202, 203, and 204 (e.g., log record sequence numbers (LRSNs), relative byte addresses (RBAs), etc.). Insert module 104 processes inserts to a table based on the table's materialization parameter. The parameter may include any suitable values to indicate a materialization mode. The materialization parameter may indicate a materialization mode from among, e.g., the following:
 1. MATERIALIZE NONE
 2. MATERIALIZE DEFERRED
 3. MATERIALIZE INDEX ONLY
 4. MATERIALIZE IMMEDIATE.

The mode MATERIALIZE NONE specifies that neither insert module 104 nor deferred materializer 106 physically write the inserted data into table data 134. Thus, the data will not be available to be read after the insert operation. All read access attempts may be rejected with, e.g., an indication that the resource is unavailable.

MATERIALIZE NONE may be used, e.g., in a mirrored system where the data is inserted in the mirrored system and then propagated (from log 132 of the first system) to another system for full read access. In this scenario, physically writing the data into the table data of the mirrored system may be avoided. This eliminates the bottlenecks of locking, performing space searches, and updating indexes. The insert module merely writes a record containing the inserted data and a table identifier (e.g., database identifier (DBID), objection identifier (OBID), etc.) to log 132. The primary limit on insert throughput typically then becomes the logging rate. If the data must later be accessed using the mirrored system, a table's materialization parameter may be altered, e.g., from MATERIALIZE NONE to MATERIALIZE DEFERRED, to initiate asynchronous materialization of the data written to the log as described below.

The mode MATERIALIZE DEFERRED specifies that the insert module write inserted data to log 132 but not to table data 134, as described above. In addition, the insert module may set log pointers 201 and 202, and may initiate a process running deferred materializer 106. Log pointers 201 and 202 define a range in the log that deferred materializer 106 may scan for records of deferred inserts to materialize. In particular, the insert module may set log pointer 201 to the lowest position in the log for a record of a deferred insert and set log pointer 202 to the highest log position of a commit for a transaction with a deferred insert. In setting log pointers 201 and 202, contention may occur only at a commit (when log pointer 202 is set) or at the first insert (when log pointer 201 is set); the cost of this contention is low compared to conventional materialization for transactions with many inserts.

The deferred materializer runs asynchronously to the insert module (e.g., as a child process of the insert module, a child process of the DBMS, a daemon, etc.). The deferred materializer reads log 132, extracts the inserted data, writes the data to table data 134, and updates indexes. In addition, the deferred materializer may track metadata for robust fault tolerance. For example, the deferred materializer may write the log position of the lowest record for which materialization has yet to commit to log pointer 203, and write the highest log position of a commit record for fully materialized data to log pointer 204.

When a user accesses data in a table for which the materialization parameter indicates MATERIALIZE DEFERRED, the system may warn the user that data inserted into the table may not yet have been materialized. For example, in a DB2® environment, the system may warn the user by returning a positive SQLCODE.

The mode MATERIALIZE INDEX ONLY specifies a hybrid procedure. As in the case of MATERIALIZE DEFERRED, the insert module writes the inserted data to log 132, writes log pointers 201 and 202, and does not write the data to table data 134. However, the insert module also synchronously builds indexes for the table. The index for an inserted row contains a pointer to the log record (e.g., LRSN, RBA, etc.) that contains the inserted row data, rather than a row identifier that points into the table data. This allows readers to access the inserted data in a predictable and repeatable manner as soon as the insert module completes processing of the insert statement. The DBMS processes a user's read request by finding the pointer to the log in the index, and retrieving the data from the log. By not placing the data in the table data, the bottlenecks of space map searches and lock contention on the data pages are eliminated. The deferred materializer then writes the row data to the table data and updates the indexes by replacing pointers to log records with row identifiers.

The MATERIALIZE IMMEDIATE mode specifies essentially the default behavior for traditional RDBMS systems. For example, the system may write the row data to the table data, write to the table's index, and write separate log records after each of the table and index write operations.

Figure 3:
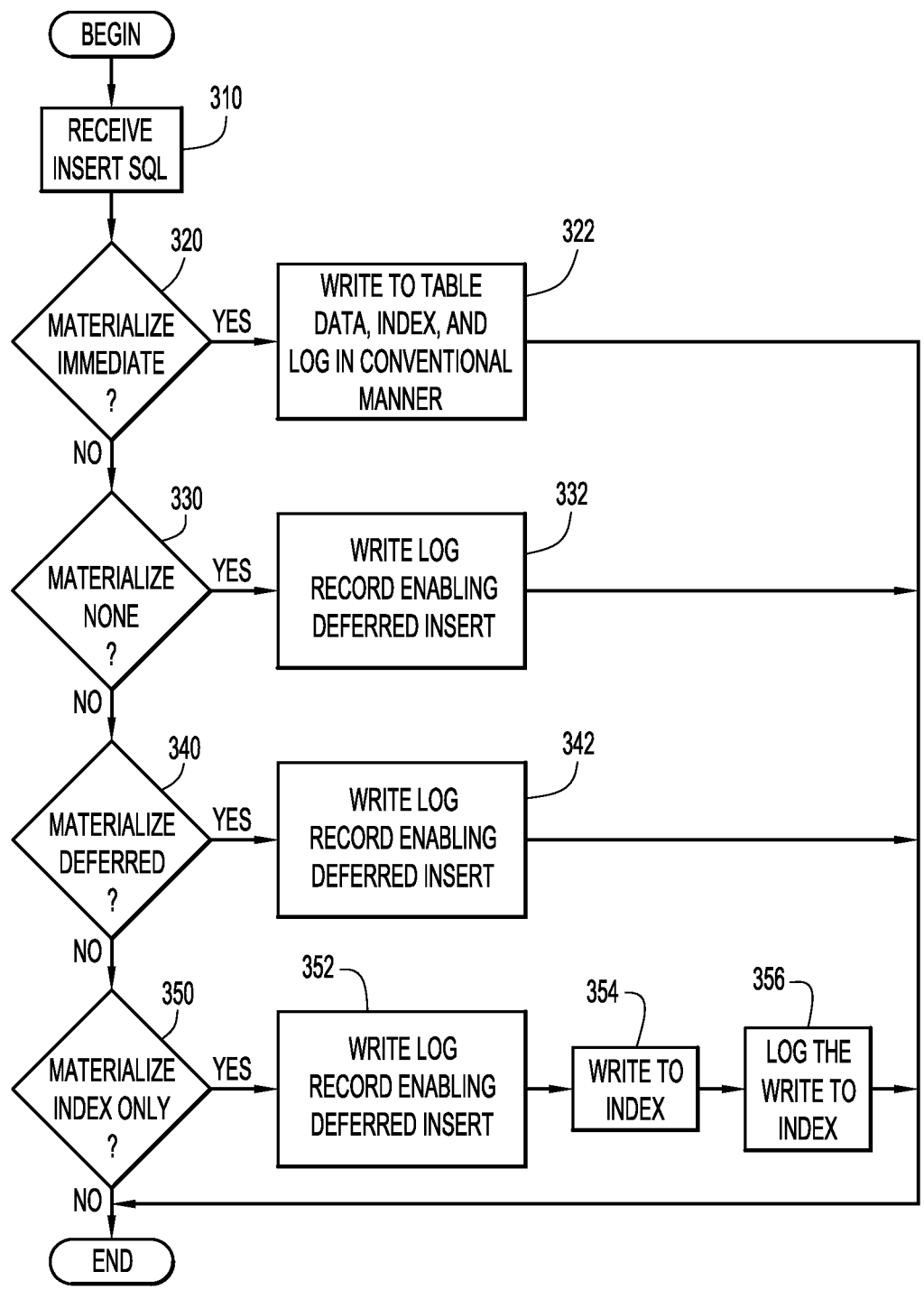
FIG. 3 is a flow diagram illustrating an example manner of handling insert instructions according to an embodiment of the present invention.

A manner in which the insert module processes insert statements (e.g., SQL INSERT statements or other DML insert statements) in a deferred materialization mode (e.g., MATERIALIZE NONE, MATERIALIZE DEFERRED, MATERIALIZE INDEX ONLY) according to an embodiment of the present invention is illustrated in FIG. 3. In particular, the insert module receives an insert statement for inserting data into a table in a deferred materialization mode at step 310.

At step 320, the insert module determines whether the materialization parameter associated with the table indicates MATERIALIZE IMMEDIATE. If so, the insert module writes the row data to table data 134, updates the table index, and writes to log 132 entries for the write to the table data and the update to the index. Processing then ends.

If the materialization parameter does not indicate MATERIALIZE IMMEDIATE at step 320, the insert module determines whether the materialization parameter indicates MATERIALIZE NONE at step 330. If so, the insert module writes a record to log 132 at step 332. This record contains the row data to insert and indicates that the insert has not been materialized (by, e.g., including the materialization parameter or other flag, writing a null value in place of a reference into the table data, etc.). Processing then ends.

If the materialization parameter does not indicate MATERIALIZE NONE at step 330, the insert module determines whether the materialization parameter indicates MATERIALIZE DEFERRED at step 340. If so, the insert module writes a record to log 132 at step 342. This record contains the row data to insert and indicates that the insert has not been materialized (by, e.g., including the materialization parameter or other flag, writing a null value in place of a reference into the table data, etc.). Processing then ends.

If the materialization parameter does not indicate MATERIALIZE DEFERRED at step 340, the insert module determines whether the materialization parameter indicates MATERIALIZE INDEX ONLY at step 350. If so, the insert module writes a record to log 132 at step 352. This record contains the row data to insert and indicates that the insert has not been materialized (by, e.g., including the materialization parameter or other flag, writing a null value in place of a reference into the table data, etc.). At step 354, an entry for the inserted data is added to the table's index. The index may be created if it does not yet exist (e.g., if this is the first row inserted to the table, and creation of the table was deferred when the table was created). This index entry includes a pointer to the log position of the record written at step 352 where the data may be found. Processing then ends.

Figure 4:
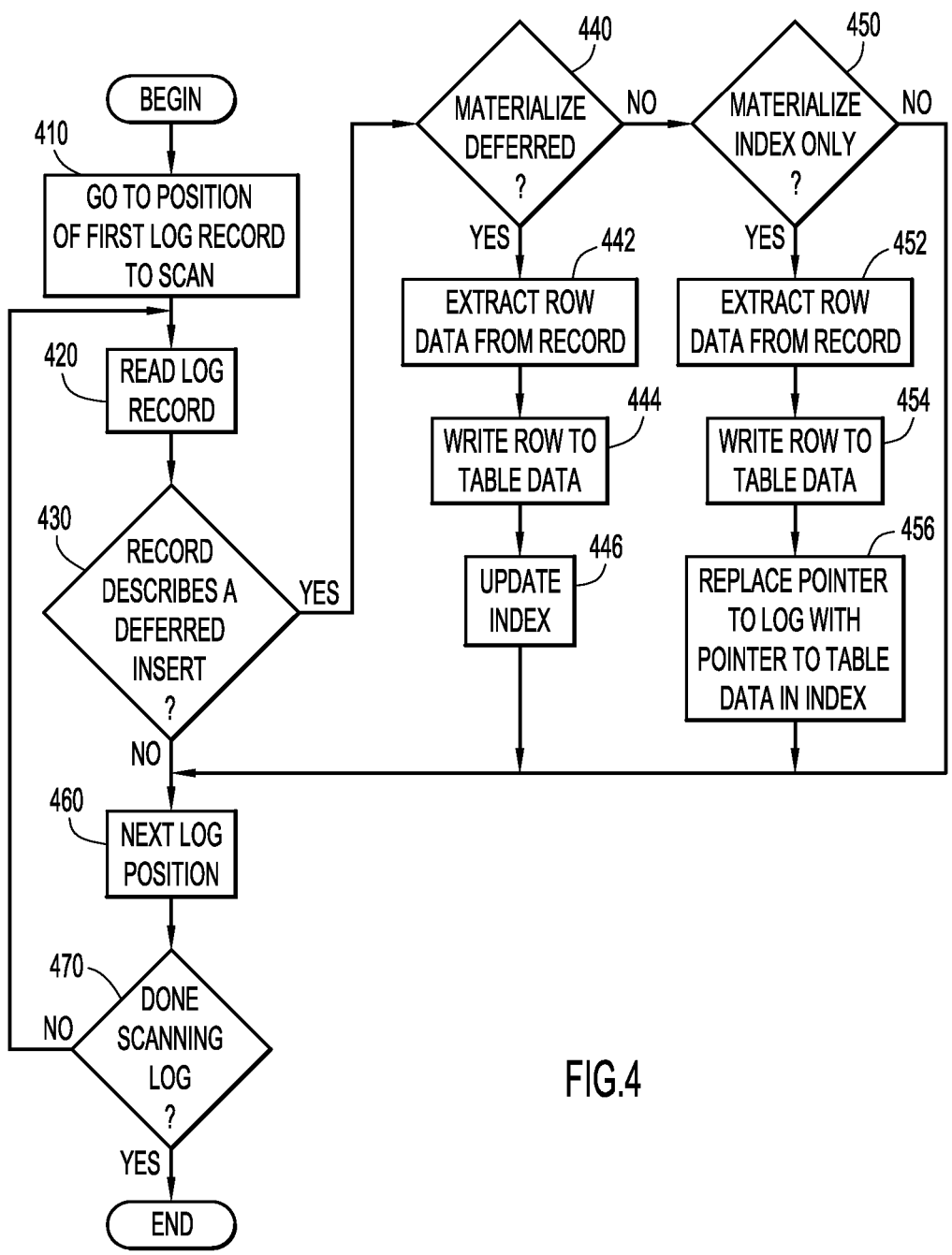
FIG. 4 is a flow diagram illustrating an example manner of materializing deferred inserts according to an embodiment of the present invention.

An example manner of materializing deferred inserts according to an embodiment of the present invention is illustrated in FIG. 4. In particular, at step 410, the deferred materializer finds the log position of the first log record to scan for deferred inserts. For example, the first log record to scan may be indicated by log pointer 201. At step 420, the deferred materializer reads the log record at the current log position. At step 430, the deferred materializer examines the log record and determines whether the record corresponds to an insert instruction for a table designated for deferred materialization (e.g., a table having a materialization parameter indicating MATERIALIZE DEFERRED or MATERIALIZE INDEX ONLY). If not, processing proceeds to step 460.

Otherwise, the deferred materializer determines whether the materialization parameter indicates MATERIALIZE DEFERRED at step 440. If so, the deferred materializer extracts the row data from the log record at step 442, writes the data into table data 134 at step 444, and updates the index at step 446. Since the deferred materializer need not materialize data synchronously with the insert module, it may perform full space searching and place data in clustering order to optimize later read access.

If the materialization parameter does not indicate MATERIALIZE DEFERRED at step 440, the deferred materializer determines whether the materialization parameter indicates MATERIALIZE INDEX ONLY at step 450. If so, the deferred materializer extracts the row data from the log record at step 452, writes the data into table data 134 at step 454, and replaces the pointer into log 132 in the row index with a pointer into table data 134 at step 456. As in the case of MATERIALIZE DEFERRED, the deferred materializer need not materialize data synchronously with the insert module, and therefore the deferred materializer may perform full space searching and place data in clustering order to optimize later read access. If the materialization parameter does not indicate MATERIALIZE INDEX ONLY at step 450, processing proceeds to step 460.

At step 460, the deferred materializer moves to the position of the next record to read in the log. At step 470 the deferred materializer determines whether it has finished its scan of the log. For example, the deferred materializer may compare the position of the current record to log pointer 202 to determine whether the end of the range of records to scan has been reached. If so, the procedure ends. Otherwise, processing returns to step 420.

The deferred materializer may run according to any schedule, using any manner of determining which log records to scan. For example, the DBMS may launch a deferred materializer process for each transaction that includes a deferred insert (e.g., MATERIALIZE DEFERRED or MATERIALIZE INDEX ONLY). In this case, the insert module may set the point at which the deferred materializer process will start to scan the log by saving the log position of the record for the first deferred insert as log pointer 201. To set an end point for the scan, the DBMS may write the log position of the commit record for the transaction as log pointer 202. The DBMS may launch the deferred materializer process for the transaction when, e.g., log pointer 201 is written, log pointer 202 is written, or any other time. Alternatively, the DBMS may run deferred materializer processes according to a schedule (e.g., hourly, daily, weekly, when a predefined number of records or transactions have been processed, etc.), where the deferred materializer initially begins scanning the log at the earliest position that may contain a deferred insert record, saves the log position to which it has progressed when the process ends, and resumes at that position when the deferred materializer is restarted.

The deferred materializer may run on a separate processor than the insert module (e.g., on a multiprocessor server, on a separate server, etc.). On a System z® platform, the deferred materializer may run on an IBM System z Integrated Information Processor (zIIP) to limit chargeable processing time.

It will be appreciated that the embodiments described above and illustrated in the drawings represent only a few of the many ways of implementing embodiments for inserting data into a database object.

The topology or environment of the present invention embodiments may include any number of computer or other processing systems, data storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The deferred materializer may run on a separate processor than the insert module (e.g., on a multiprocessor server, on a separate server, etc.). On a SYSTEM Z® platform, the deferred materializer may run on a zIIP processor to limit chargeable processing time. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases (e.g., relational, object oriented, etc.), file systems, caches, repositories, warehouses, etc. The system may be implemented for any DBMS on any platform.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for deferred and/or incomplete materialization of any data. Any metadata items may be stored by any modules in any storage systems, and any procedures for scanning the log to materialize deferred inserts may be used (e.g., scanning the range defined by log pointers 201 and 202, scanning a complete log, scanning a range corresponding a time during which a table was designated for a particular manner of materialization, etc.).

The deferred materializer may run at any time. For example, the insert module may start a deferred materializer process when it first inserts data for a table designated for deferred materialization, e.g., at step 360 (FIG. 3). Alternatively, the DBMS may start the deferred materializer at pre-scheduled times, ad hoc times, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for inserting data into a database object comprising:
   at least one processor configured to:
      associate the database object with a parameter specifying materialization of data for the database object;
      upon receiving a request to insert data into the database object, bypass the database object and insert the data directly into a database log; and
      insert the data from the database log into the database object and materialize the data in accordance with the parameter to provide access to the data from the database object, wherein the parameter specifies a portion of the data to be materialized upon insertion.

2. The system of claim 1, wherein the parameter specifies that no data is to be materialized upon insertion into the database object, thereby precluding reading of the data from the database object.

3. The system of claim 1, wherein the parameter specifies deferred materialization and the materialization is performed asynchronously to the data insertion.

4. The system of claim 3, wherein the processor is further configured to:
   insert the data into a database log; and
   wherein the materialization includes:
      identifying data in the database log associated with deferred materialization and extracting identified data from the database log designated for insertion into the database object; and
      materializing the extracted data within the database object and one or more indexes to provide access to the data from the database object.

5. The system of claim 1, wherein the parameter specifies materialization of an index and the data is accessible upon insertion.

6. The system of claim 5, wherein the materialization is performed asynchronously to the data insertion, and the processor is further configured to:
   insert the data into a database log and construct the index with pointers to the database log to provide access to the data; and
   wherein the materialization includes:
      identifying data in the database log associated with the index materialization and extracting identified data designated for insertion into the database object; and
      materializing the extracted data within the database object and one or more indexes to provide access to the data from the database object.

7. The system of claim 2, wherein the processor is further configured to:
   insert the data into a database log; and
   read the log to replicate the database object.

8. A computer program product for inserting data into a database object comprising:
   a computer readable storage device having computer readable program code embodied therewith for execution on a processing system, the computer readable program code comprising computer readable program code configured to:
   associate the database object with a parameter specifying materialization of data for the database object;
   upon receiving a request to insert data into the database object, bypass the database object and insert the data directly into a database log; and
   insert the data from the database log into the database object and materialize the data in accordance with the parameter to provide access to the data from the database object, wherein the parameter specifies a portion of the data to be materialized upon insertion.

9. The computer program product of claim 8, wherein the parameter specifies that no data is to be materialized upon insertion into the database object, thereby precluding reading of the data from the database object.

10. The computer program product of claim 8, wherein the parameter specifies deferred materialization and the materialization is performed asynchronously to the data insertion.

11. The computer program product of claim 10, wherein the materialization includes:
   identifying data in the database log associated with deferred materialization and extracting identified data from the database log designated for insertion into the database object; and
   materializing the extracted data within the database object and one or more indexes to provide access to the data from the database object.

12. The computer program product of claim 8, wherein the parameter specifies materialization of an index and the data is accessible upon insertion.

13. The computer program product of claim 12, wherein the materialization is performed asynchronously to the data insertion, and the computer readable program code is further configured to:
   insert the data into a database log and construct the index with pointers to the database log to provide access to the data; and
   wherein the materialization includes:
      identifying data in the database log associated with the index materialization and extracting identified data from the database log designated for insertion into the database object; and
      materializing the extracted data within the database object and one or more indexes to provide access to the data from the database object.

* * * * *